United States Patent [19]
Booth

[11] 3,892,431
[45] July 1, 1975

[54] AIR HOSE ANTI-DISCONNECT
[75] Inventor: Larry H. Booth, Huntington, W. Va.
[73] Assignee: The Chesapeake and Ohio Railway Company, Cleveland, Ohio
[22] Filed: Dec. 13, 1973
[21] Appl. No.: 427,011

[52] U.S. Cl. .................................. 285/79
[51] Int. Cl. ....... B60d 1/08; B61g 5/08; F16b 55/00
[58] Field of Search .................. 285/68–79, 285/18, 85, 91, 81, 82, 87, 90, 305, 308, 310, 311, 320

[56] References Cited
UNITED STATES PATENTS

| | | | |
|---|---|---|---|
| 423,853 | 3/1890 | Belisle | 285/68 |
| 1,354,643 | 10/1920 | Brower | 285/77 |
| 3,104,896 | 9/1963 | Kennedy | 285/18 |

*Primary Examiner*—Geo. V. Larkin
*Attorney, Agent, or Firm*—Cushman, Darby & Cushman

[57] ABSTRACT

An air hose anti-disconnect is provided for rotatably interlocking coupling halves or housings which couple respective air hoses. The anti-disconnect utilizes a movable pin which is urged outwardly by a spring to prevent inadvertent rotational disengagement of the coupling halves while not impeding disengagement caused by applying longitudinal or axial forces to the air hoses. The movable pin may also be urged inwardly against the spring to enable the halves to become rotatably disengaged by hand.

4 Claims, 5 Drawing Figures

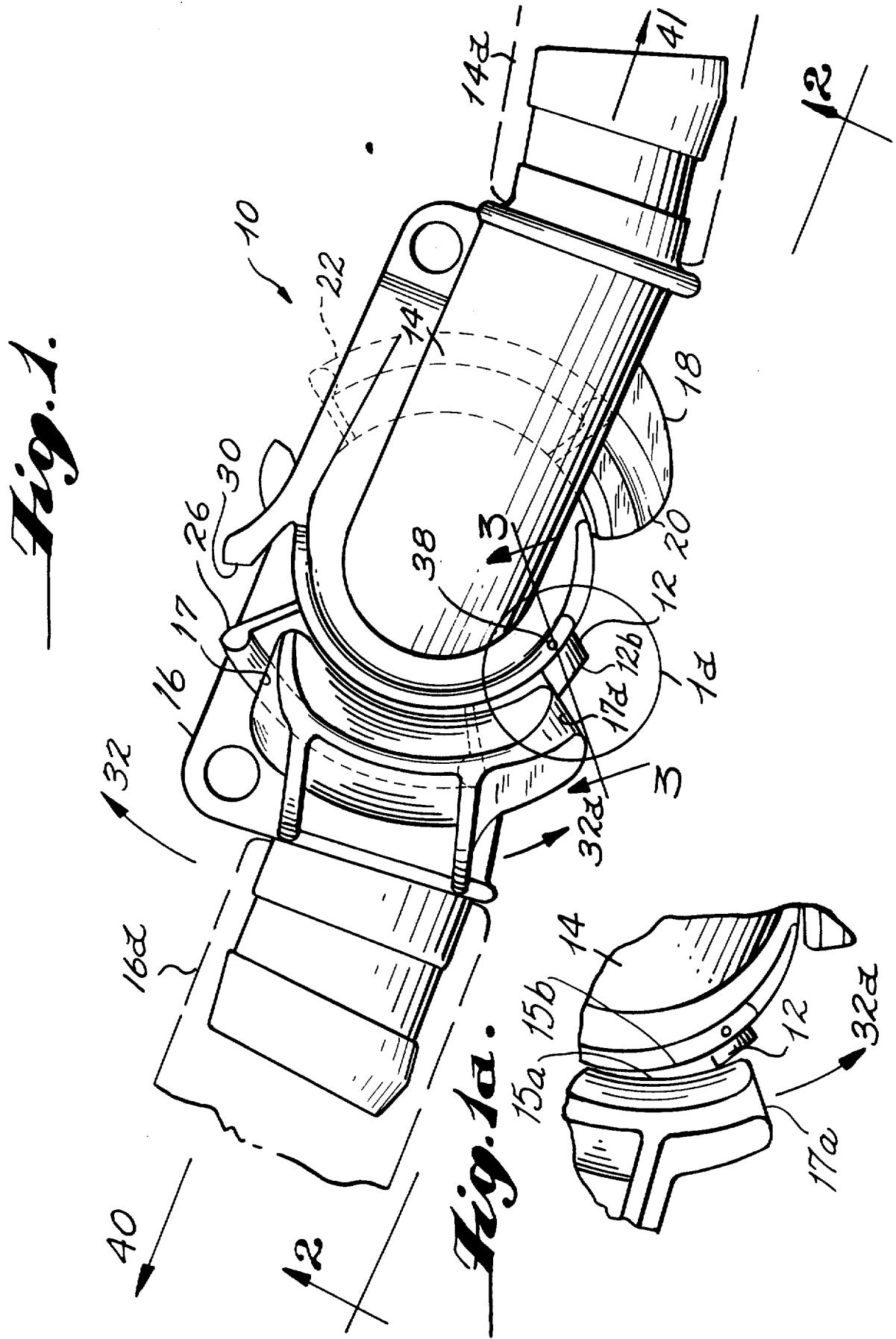

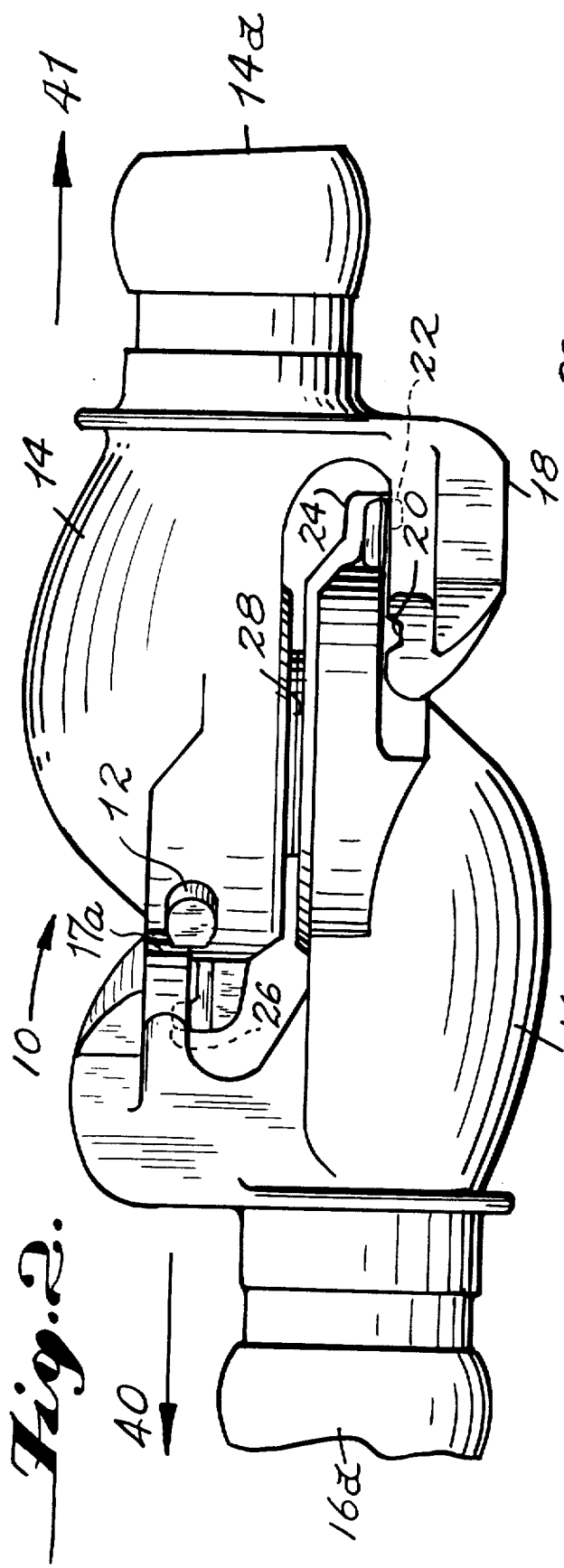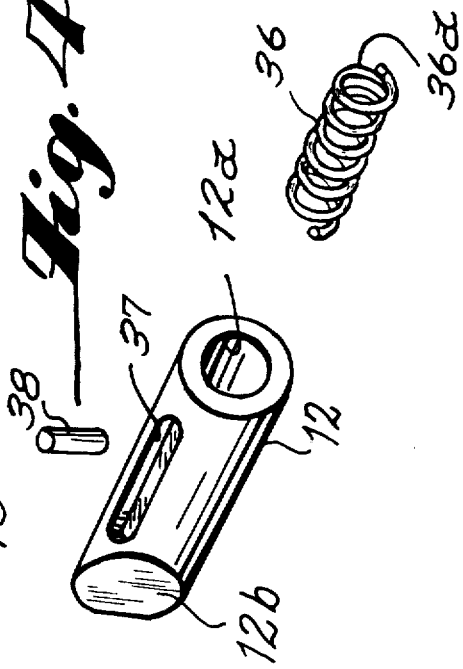

3,892,431

AIR HOSE ANTI-DISCONNECT

BACKGROUND OF THE INVENTION

A. Field of the Invention

This invention relates to a locking device for air hose couplings and more particularly to a locking device which provides for the quick disengagement of rotatably engaged air hose coupling halves. Rotatably engageable coupling halves are well known in the art for providing a coupling between air hoses typically used in conjunction with air brakes for railroad cars.

B. Description of the Prior Art

In railroad practice, it is well known to provide air hoses which transport compressed air to be used in operating air brakes on railroad cars. The air hoses extend from one railroad car to another and are joined between two cars by means of a coupling. These couplings are typically rotatably engaged, the couplings being comprised of two coupling halves or housings which pivot with respect to one another so that when a train travels around a bend the rotatable coupling compensates for compressive forces in the hoses. The coupling is also utilized to unhook air hoses when train cars are separated from each other. A released coupling housing may then be matched up with a like coupling housing on another box car.

One recurring problem with standard couplings is that they may become inadvertently rotatably disengaged. To prevent such from happening, various locking devices have been proposed. The problem existing with such prior art devices is, that while preventing rotational disengagement, these devices also prevent disengagement when a longitudinal force is applied along the length of the hoses. A longitudinal or axial force is applied to the hoses when railroad cars are uncoupled. The heretofore dilemma apparently resided in the fact that while couplings could be constructed so as to prevent rotational disengagement, there was no provision to allow the couplings to become disengaged when an axial force was applied.

In U.S. Pat. No. 1,354,643 there is disclosed a lock for air hose couplings in which rotational disengagement is prevented by using a pin displaced through holes provided in each of the interlocking halves of the coupling. The disclosed pin prevents rotational disengagement and also prevents the couplings from becoming axially disengaged when railroad cars are uncoupled.

U.S. Pat. No. 2,684,860 discloses a quick lock seal coupling for hose or pipe conduits. This coupling utilizes a spring loaded pin which prevents rotational disengagement of the coupling halves, but by virtue of locking lugs adapted to fit into sockets, the couplings are unable to become disengaged when an axial force is applied to the respective hoses.

As described in U.S. Pat. No. 767,843, a spring loaded plunger or pin prevents rotational disengagement of two coupling halves by maintaining a lug secured within a slot. Because the lug is secured within a slot, it is readily apparent that the coupling housings may not be disengaged by applying an axial force to associated coupling hoses.

Another prior art device is described in U.S. Pat. No. 3,583,731 which sets forth a manifold connector for connecting two portions of a conduit which utilizes a cam ring engaging wedged teeth. In this device, a spring loaded pin is also used, but the deficiency of not providing for axial disengagement while at the same time preventing rotational disengagement is readily apparent.

The present invention as hereinafter described is addressed to the problem of providing a coupling which may be axially disengaged when railroad cars become uncoupled and also provides for rotational engagement allowing the couplings to rotate with respect to each other without becoming inadvertently disengaged. The present invention further provides for such an improvement by utilizing a simple spring loaded pin which may be readily adapted to conventional rotational interlocking coupling halves.

SUMMARY OF THE INVENTION

It is therefore an object of the present invention to provide for the axial disengagement of two interlocking air hose coupling halves while at the same time preventing rotational disengagement.

It is another object of the present invention to provide interlocking coupling halves having the capability of being rotatably engaged for a relatively large arc or swing.

Another object of the present invention is to provide a simple spring loaded pin means which serves as a stop for preventing rotational disengagement of interlocking coupling hoses, the pin also being manually depressible to permit rotational disengagement.

Still another object of the present invention is to provide for a depressible pin or stop means comprising a spring loaded pin which may be readily adapted to an existing coupling half without extensive machining or casting operations.

Another object of the present invention is to provide a depressible pin or stop means that will prevent online delays occuring when air hose couplings become rotatably disengaged because railroad cars travel around a bend in a railroad track or strike objects upon the track. Such a preventive device would avert damage to lading or equipment caused by emergency action when air hoses become disconnected while the train is moving.

A still further object of the present invention is to provide a depressible pin or stop means for a coupling half which is inexpensive to install and which may be provided on a coupling half with a minimum expenditure of materials and labor.

Additional objects of the present invention reside in the specific construction of the exemplary device hereinafter particularly described in the specification and shown in the several drawings.

BRIEF DESCRIPTION OF THE DRAWINGS

FIG. 1 illustrates a top view of two typical air hose couplings rotatably engaged, the lower of the couplings being impeded from further rotational displacement because of contact with a releasable pin or stop means.

FIG. 1a is an enlarged view taken along circular cut 1a, and illustrates how the inward urging of the releasable stop means provides for rotational disengagement of the coupling halves.

FIG. 2 is a side view taken along line 2—2 of FIG. 1 and illustrates the connection of the hose coupling halves.

FIG. 3 is a diagrammatic view of the cut taken along line 3—3 of FIG. 1.

FIG. 4 is an exploded view of the releasable stop means showing the interrelationship of the movable pin, retaining pin and the spring means.

Novel features of the improved air hose coupling device in accordance with the present invention will be more readily understood from a consideration of the following description taken together with the accompanying drawing, in which certain preferred adaptions are illustrated with the various parts thereof identified by suitable reference characters in each of the views.

DETAILED DESCRIPTION OF THE INVENTION

In FIG. 1 of the drawings, reference numeral 10 generally designates a typical air hose coupling which utilizes a releasable stop means comprising a spring loaded detent or pin 12 disposed in a coupling housing. From a viewing of FIGS. 1 and 2, it can be seen that the coupling consists of two interlocking halves or housings, 14 and 16. The interlocking coupling halves 14 and 16 are employed to rotatably connect air hoses 14a and 16a, respectively. The interlocking coupling 10 uses coupling halves produced from metal castings, and as such, is old in the art. The present invention is directed to the use of a novel releasable stop means. The interlocking halves 14 and 16 permit air to be passed from air hose 14a through the coupling housing 14 and coupling housing 16 outwardly through air hose 16a. The air hose coupling housings 14 and 16 are rotatably secured together by means of grooves and runners. For instance, it can be seen that coupling housing 14 incorporates an extended lower lip portion 18 having an arcuate groove 20. The groove 20 is adapted to receive a runner 22 which is formed from lip portion 24 of coupling housing 16. Likewise, coupling housing 16 employs a groove (not shown) adapted to receive a runner 26 which is an integral extension of lip portion 27 of coupling housing 14. The grooves and corresponding runners are designed to form interlocking arcuate segments, and it can be readily appreciated that hose coupling housings 14 and 16 may be rotatably engaged by inserting the runner of one of the housings with the corresponding grooves of the other housing. As shown in FIG. 2, runner 22 is disposed in groove 20 and runner 26 is disposed in a corresponding groove (not shown) in housing 16. When the housings are thusly engaged, each housing may be rotated with respect to the other along an arcuate path defined by the interfitting runners and grooves. Rubber seals 28 provide for an airtight fit between housings 14 and 16.

Returning in particular to FIG. 1, it can be noted that housing 16 and housing 14 are rotatably engaged with each other. This rotational engagement is of paramount importance when the housing couplings are used to connect air hoses 14a and 16a between railroad cars. Railroad cars require such a pivotal connection between air hoses because the cars travel around bends in a railroad track. Without such a rotational connection, a coupling would be subjected to severe stresses, and cracks or breaks could result, causing a permanent impairment of the air transporting capabilities of the coupling.

On coupling 14 there is located first stop or abutment means 30. Abutment means 30 will impede the rotation of housing 16 when housing 16 is rotated in a first direction indicated by arrow 32. A surface 17 arranged on housing 16 will contact abutment means 30 when the housing 16 is pivoted in direction 32 by a predetermined arc. Conversely, if housing 16 is rotated with respect to housing 14 in a direction corresponding to that indicated by arrow 32a, a surface 17a of housing 16 will encounter a second releasable stop means comprising spring biased detent or pin 12 which prevents rotation in the direction of 32a. Thus, it is apparent that the degree of rotation between housing 16 and housing 14 is limited by abutment means 30 and spring biased detent or pin 12. A predetermined arc of travel between abutment means 30 and surface 17 and between surface 17a and spring biased detent or pin 12 will be designed to provide for the maximum amount of rotation of housing 14 with respect to housing 16 which could be reasonably expected in railroad use.

In the exemplary embodiment, it is contemplated that the spring biased detent or pin 12 be operatively disposed within a securing means or a bore 34 formed in one of the coupling halves, for instance coupling 14 as shown in FIGS. 1–3. Spring biased detent or pin 12 is urged outwardly by a spring 36 which is disposed interiorly of the bore 34. With particular reference to FIG. 4, there is shown an exploded view of pin 12 which is provided with a slot 37 adapted to receive a retaining pin 38. Spring biased pin 12 further utilizes a longitudinal bore 12a of diameter sufficiently large to receive spring 36. Now, with reference to FIG. 3, it can be seen that spring biased pin 12 is slidably engaged within bore 34. Spring biased pin 12 is retained within bore 34 by retaining pin 38 secured within slot 37 for limiting movement of spring biased pin 12 to the overall length of the slot 37. It is contemplated that pin 38 be disposed through a hole 38a in housing 14 and secured therein by a press fit. The spring 36 is of helical coil construction and urges spring biased pin 12 outwardly until spring biased pin 12 is prevented from further outward movement by retaining pin 38. Helical spring 36 has one end 36a disposed against the housing 14 at the inward end 34a of the bore 34.

A further feature of the spring biased pin 12 is that the outer end 12b is machined so that it coincides approximately with the curved faces 15a and 15b of the coupling housings.

With a consideration of FIGS. 1 and 1a, the operation of the present invention will now be described. In FIG. 1, there is shown a typical arrangement wherein housings 14 and 16 are coupled together and are prevented from rotational disengagement by stop means 30 and spring biased pin 12. If spring biased pin 12 is depressed or urged inwardly, as shown in FIG. 1a, coupling housing 16 may be pivoted or rotated in direction 32a past spring biased pin 12 until the two housings become completely disengaged. When it is desired to reengage housings 14 and 16, spring biased pin 12 is depressed once again against spring 36 to allow housing 16 to pivot or rotate past spring biased pin 12 in direction 32 when the corresponding grooves and runners have been properly joined to allow engagement. As the face 17a moves past face 12b of spring biased pin 12, spring 36 will urge spring biased pin 12 outwardly. Thus, it can be seen that spring biased pin 12 provides an additional abutment preventing rotational disengagement until such time as the spring biased pin 12 is urged inwardly to enable housings 14 and 16 to become disengaged.

The above-described coupling device provides for a readily usable releasable stop means which can be manually operated by an individual and which furthermore does not become detached from the coupling as in other prior art coupling retaining devices. It should be further noted that the drawings illustrate spring biased pin 12 as being within a bore in housing 14. It is certainly within the spirit and scope of the invention that spring biased pin 12 could be disposed in coupling housing 16 as coupling housings are typically of identical construction. Furthermore, it can be seen that such a spring biased pin 12 could be economically and rapidly adapted to such a coupling housing.

Though the spring biased pin 12 and first stop means 30 prevent rotational disengagement of housings 14 and 16, it will be understood that the foregoing arrangement will not impede axial separation of the housings if a sufficient force is applied. Axial separation will occur only if railroad cars are uncoupled and pulled apart. The resulting axial forces, which are applied longitudinally to the hoses in the direction of arrows 40 or 41, will cause the runners to be forcedly detached from the corresponding grooves, thus separating the coupling halves. If spring biased pin 12 were not provided, rotational disengagement of the coupling halves could inadvertently take place. Rotational disengagement of the coupling halves will not occur until spring biased pin 12 is urged inwardly; yet sufficient longitudinal or axial forces will still cause coupling disengagement.

It is further contemplated that the spring biased pin 12 be constructed of machined steel as will retaining pin 38 and helical coil spring 36. It must be emphasized that converting a typical pair of coupling halves within the modifications of the present invention can be accomplished by any skilled railroad mechanic.

While the invention has been particularly shown and described with reference to the foregoing preferred embodiment thereof, it will be understood by those skilled in the art that other changes in form and detail may be made therein without departing from the spirit and scope of the invention as described in the appended claims.

I claim:

1. An interlocking hose coupling having at least first and second rotatably engaging housings which couple respectively associated hoses, said coupling being disengageable when sufficient separating forces are exerted axially along said hoses, said coupling comprising:

a. a first stop means disposed on said first housing arranged to contact said second housing and to thereby impede rotation of said second housing with respect to said first housing when said second housing is rotated in a first direction so that said housings do not become inadvertently separated by rotational movement in said first direction; and b. a second releasable stop means permanently secured to one of said housings and normally urged to a position for contacting the other housing and thereby impeding rotation of said second housing with respect to said first housing when said second housing is rotated in a second direction so that said housings do not become inadvertently separated by rotational movement in said second direction;

wherein said first and second stop means limit rotational movement in said first and second directions to a predetermined rotational arc when said housings are rotatably engaged;

wherein said second releasable stop means controllably permits the rotational disengagement of said second housing from said first housing when actuated; and wherein neither of said first and second stop means impedes separation of said first and second housings by separating forces exerted axially along said hoses.

2. The device of claim 1 wherein said releasable stop means comprises a movable detent depressible inwardly and normally urged outwardly through a bore disposed in said one of said housings.

3. The device of claim 2 wherein said movable detent is spring biased so that it is normally urged outwardly.

4. The device of claim 3 wherein a retaining pin disposed in one of said housings is inserted through a slot in said movable detent, said pin and slot limiting the maximum inward and outward positions of said movable detent, the normally urged outward position locating said movable detent so that it will contact and thereby prevent said second housing from becoming rotatably disengaged from said first housing, said movable detent also being manually depressible inwardly against said spring bias to permit said second housing to become rotatably displaced over said movable detent so that said second housing may become rotatably disengaged from said first housing.

* * * * *